United States Patent
Tan et al.

(10) Patent No.: US 12,153,167 B2
(45) Date of Patent: Nov. 26, 2024

(54) RANGING SYSTEMS OF A DUAL OPTICAL FREQUENCY COMB TIME-OF-FLIGHT MANNER BASED ON DISPERSIVE FOURIER TRANSFORM

(71) Applicant: UNIVERSITY OF ELECTRONIC SCIENCE AND TECHNOLOGY OF CHINA, Sichuan (CN)

(72) Inventors: Teng Tan, Chengdu (CN); Bing Chang, Chengdu (CN); Baicheng Yao, Chengdu (CN); Xinyue He, Chengdu (CN); Zihan Liu, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 18/401,295

(22) Filed: Dec. 29, 2023

(65) Prior Publication Data
US 2024/0219532 A1    Jul. 4, 2024

(30) Foreign Application Priority Data
Dec. 30, 2022  (CN) .......................... 202211730254.X

(51) Int. Cl.
*G01S 7/4865*     (2020.01)
*G01S 7/481*      (2006.01)
(Continued)

(52) U.S. Cl.
CPC .......... *G01S 7/4865* (2013.01); *G01S 7/4815* (2013.01); *G01S 7/484* (2013.01); *G01S 17/10* (2013.01)

(58) Field of Classification Search
None
See application file for complete search history.

(56) References Cited

U.S. PATENT DOCUMENTS

2011/0285980 A1*  11/2011  Newbury ................ G01S 7/484
                                                    356/3
2015/0002920 A1*   1/2015  Shi ..................... H04B 10/2575
                                                    359/276

FOREIGN PATENT DOCUMENTS

CN        112505716 A   *  3/2021  ............. G01S 17/14

OTHER PUBLICATIONS

CN 112505716 A English (Year: 2021).*
Coherent Dual Comb Spectroscopy at High Signal to noise (Year: 2010).*

* cited by examiner

*Primary Examiner* — Yuqing Xiao
*Assistant Examiner* — Jempson Noel
(74) *Attorney, Agent, or Firm* — PORUS IP LLC

(57) ABSTRACT

The embodiments of the present disclosure provide a ranging system of a dual optical frequency comb time-of-flight manner based on dispersive Fourier transform. The embodiment of the present disclosure introduces a dispersive Fourier transform technology into a conventional dual optical frequency comb system, which amplifies a stray relationship of a pulse time domain using a dispersion element and obtains a precise position relationship of three pulses directly through interfering fringe information. Therefore, the "dead zone" in the conventional dual optical frequency comb ranging system is eliminated, and the ranging accuracy of the system is greatly improved, and a repetition frequency difference of the dual optical frequency combs can be increased to a magnitude of MHz, which greatly improves the ranging speed. The ranging system has advantages of a large measurement range, a high measurement accuracy, and a high measurement speed.

7 Claims, 3 Drawing Sheets

(51) Int. Cl.
*G01S 7/484* (2006.01)
*G01S 17/10* (2020.01)

RANGING SYSTEMS OF A DUAL OPTICAL FREQUENCY COMB TIME-OF-FLIGHT MANNER BASED ON DISPERSIVE FOURIER TRANSFORM

CROSS-REFERENCE TO RELATED APPLICATIONS

This application claims priority of Chinese Patent Application No. 202211730254.X, filed on Dec. 30, 2022, the entire contents of which are hereby incorporated by reference.

TECHNICAL FIELD

The present disclosure relates to the field of absolute distance measurement with large-range and high-precision and the application field of dual optical frequency comb, and in particular, to a ranging system of a dual optical frequency comb time-of-flight manner based on dispersive Fourier transform.

BACKGROUND

An optical frequency comb refers to a spectrum comprised of a series of discrete frequency components that are uniformly spaced and have a stable phase relationship. According to the Fourier transform, the optical frequency comb is able to provide time-domain pulses with a stable spacing, which is a natural time-frequency reference and a highly stable pulse laser source. In recent years, there is a growing demand for a high-performance ranging system due to the rapid development of technologies such as self-driving cars, perimeter security detection, and intelligent robotics. Using an optical frequency comb as the light source, laser radar has become a hot research field, and one of the important manners is ranging through a dual optical frequency comb time-of-flight manner. A ranging system based on the dual optical frequency comb time-of-flight manner usually uses two optical frequency combs with slightly different repetition frequencies as light sources. Due to the small difference between their periods, there is a certain time slip between two pulses for each pulse period. When the time slips are accumulated to reach a whole pulse period, the two pulses may be aligned again and form an enhanced signal. That is, the local oscillator optical comb performs asynchronous sampling on the signal optical comb, which stretches and amplifies the originally small pulse time delay in the time domain, thereby greatly reducing the dependency on the detector bandwidth.

The dual optical frequency comb time-of-flight manner fully combines advantages of ultra-fast optical frequency comb pulses and ultra-high spectral resolution and is greatly improved in terms of a ranging range, a ranging speed, and a ranging accuracy compared with the conventional ranging schemes. However, the ranging system of the dual optical frequency comb time-of-flight manner with asynchronous sampling also has some issues at present. Firstly, when a measured distance is close to an integer multiple of the unambiguous ranging range corresponding to the dual optical frequency comb time-of-flight manner, reference and target interference signals will overlap in a time domain, which makes the distance fail to be measures. A distance corresponding to a length of the time domain of the interference signal is referred to as a ranging "dead zone." Secondly, the current mainstream manner for distance measurement is to extract the interference signal envelope by performing the Hilbert transform on an interference pattern and taking the modulus, and calculate a time delay of vertices of reference and target signal envelopes by performing Gaussian fitting on the envelope, thereby determining the distance corresponding to the time of flight. However, since the pulse sequence of the optical frequency comb in the time domain is discretely distributed, positions of the enhancement peaks are also discrete. The pulse moment positions obtained by calculating the pulse envelope have a large error, and an actual position relationship of the three pulses fails to be determined, which results in a relatively low ranging accuracy (generally on a magnitude of $\mu$m). In addition, the envelope extraction scheme requires the system to meet the Nyquist sampling theorem, that is, a difference between repetition frequencies of the two optical frequency combs may need to be not too large, which severely limits the application of the time-of-flight manner in scenarios with a high requirement of a ranging speed.

In summary, to address the problems of the "dead zone" in ranging using the conventional time-of-flight manner and the relatively large error in pulse envelope time delay calculation, it is of vital importance to develop a laser ranging system that has a large range, a high accuracy, and a small spatial resolution.

Therefore, it is desirable to provide ranging systems of a dual optical frequency comb time-of-flight manner based on dispersive Fourier transform, which can completely eliminate the measurement "dead zone" in the conventional time-of-flight ranging system, maintain an ultra-long detection distance and an ultra-fast measurement speed, and achieve high-precision continuous measurement without a magnitude.

SUMMARY

To achieve the above purpose, one or more embodiments of the present disclosure provide a ranging system of a dual optical frequency comb time-of-flight manner based on dispersive Fourier transform. The system may include a mode-locked fiber laser of a signal femtosecond pulse, a mode-locked fiber laser of a local oscillator femtosecond pulse, a circulator, a collimator, a reference mirror, a target mirror, a first polarization controller, a second polarization controller, a first fiber attenuator, a fiber coupler, a dispersion element, an erbium-doped fiber amplifier, a second fiber attenuator, a photodetector, an analog to digital (A/D) collection device, and a computer.

The mode-locked fiber laser of a signal femtosecond pulse and the mode-locked fiber laser of a local oscillator femtosecond pulse emit a signal femtosecond pulse sequence and a local oscillator femtosecond pulse sequence, respectively, the signal femtosecond pulse sequence having a first repetition frequency, and the local oscillator femtosecond pulse sequence having a second repetition frequency; the signal femtosecond pulse sequence is injected into the collimator through a first port of the circulator, collimated space light is emitted to the reference mirror and the target mirror to obtain an echo signal including a reference echo pulse sequence and a target echo pulse sequence, and the echo signal is injected into the first polarization controller through a third port of the circulator; and the local oscillator femtosecond pulse sequence is coupled with the echo signal through the fiber coupler after passing through the second polarization controller and the first fiber attenuator in turn; and the dispersive Fourier transform is performed on an output signal of the fiber coupler through the dispersion element, an optical signal is amplified through the erbium-doped fiber amplifier, an optical power is adjusted through the second fiber attenuator, and the photodetector detects an interfering signal output after being adjusted by the second fiber attenuator to obtain an analog electrical signal, the analog electrical signal being converted into a digital signal by the A/D collection device and transmitted to the computer for data processing.

In some embodiments, the mode-locked fiber laser of a signal femtosecond pulse and the mode-locked fiber laser of a local oscillator femtosecond pulse adopt a same type of passive mode-locked fiber laser.

In some embodiments, the passive mode-locked fiber laser includes at least one of a mode-locked fiber laser based on a real saturable absorber, a mode-locked fiber laser based on a nonlinear amplifying loop mirror (NALM), a mode-locked fiber laser based on a nonlinear polarization rotation (NPR) effect, or a mode-locked fiber laser based on nonlinear multimode interference (NL-MMI).

In some embodiments, the first repetition frequency $f_{r1}$ (corresponding to the signal pulse sequence period $T_1$) and the second repetition frequency $f_{r2}$ (corresponding to the signal pulse sequence period $T_2$) need to satisfy a suitable range and neither be too large nor too small. If the first repetition rate $f_{r1}$ and the second repetition frequency $f_{r2}$ are too small, the system may have a small unambiguous range. If the first repetition rate $f_{r1}$ and the second repetition frequency $f_{r2}$ are too large, a ranging speed may be reduced.

In some embodiments, for example, a value of the first repetition frequency may be in a range of 1 MHz~100 MHz, and a value of the second repetition frequency may be in a range of 1 MHz~100 MHz. At the same time, a repetition period $\Delta T$ of the signal femtosecond pulse sequence and the local oscillator femtosecond pulse sequence is less than twice a maximum pulse time delay in the dispersive Fourier transform, and $\Delta T=T_2-T_1$, the $T_1$ being a period of the signal femtosecond pulse sequence and the $T_2$ being a period of the local oscillator femtosecond pulse sequence. The maximum pulse time delay is determined based on an amount of dispersion of the used dispersion element, a bandwidth of the photodetector, and a bandwidth and a sampling rate of the A/D collection device.

In some embodiments, the total amount of dispersion of the dispersion element makes the local oscillator femtosecond pulse sequence, the reference echo pulse sequence, and the target echo pulse sequence be fully stretched in a time domain, and a stretching value of each pulse sequence of the local oscillator femtosecond pulse sequence, the reference echo pulse sequence, and the target echo pulse sequence does not exceed a self-period of the each pulse sequence.

In some embodiments, the bandwidth of the photodetector may need to be large enough, for example, the bandwidth of the photodetector is greater than 10 GHz.

In some embodiments, the bandwidth and the sampling rate of the A/D collection device may need to be large enough. For example, the bandwidth of the A/D collection device is greater than or equal to 16 GHz and the sampling rate of the A/D collection device is greater than or equal to 40 Gs/s, and a length of time of each collection is greater than or equal to $1/|f_{r1}-f_{r2}|$.

In some embodiments, the data processing in the computer is calculating a time of flight and a distance between a target echo pulse and a reference echo pulse and specifically includes:

collecting, by the A/D collection device, a time-domain waveform (interferogram) of an update period, wherein a length of time for which the dual optical frequency comb produces two successive enhancements is referred to as an update period $T_{update}$, $T_{update}=1/|f_{r1}-f_{r2}|$, the time-domain waveform includes information of a reference enhancement peak and a target enhancement peak, the reference enhancement peak includes successive enhancement peak P1 and enhancement peak P2, center moments of the enhancement peak P1 and the enhancement peak P2 correspond to $t_{p1}$ and $t_{p2}$ in turn, the target enhancement peak includes successive enhancement peak P3 and enhancement peak P4, and center moments of the enhancement peak P3 and the enhancement peak P4 correspond to $t_{p3}$ and $t_{p4}$ in turn;

calculating a count N of local oscillator pulse periods between the enhancement peak P1 and the enhancement peak P4, wherein $N=\lfloor(t_{P4}-t_{P1})/T_2\rfloor$, and $\lfloor\ \rfloor$ denotes rounding down;

obtaining an interference fringe period of the enhancement peak P1 and an interference fringe period of the enhancement peak P4 by performing Fourier transform on a time signal of the enhancement peak P1 and a time signal of the enhancement peak P4, respectively, and recording the interference fringe period of the enhancement peak P1 and the interference fringe period of the enhancement peak P4 as $T_{p1}$ and $T_{p4}$ in turn; and obtaining, according to a correspondence between the pulse time delay and the interference fringe period (as shown in FIG. 3), a time delay $\tau_{p1}$ between a reference echo pulse and a local oscillator pulse in the enhancement peak P1 and a time delay $\tau_{p4}$ between a target echo pulse and a local oscillator pulse in the enhancement peak P4, wherein $\tau_{p1}=D/T_{p1}$, $\tau_{p4}=D/T_{p4}$, and the D denotes a total amount of dispersion applied to the pulse by the dispersion element; and obtaining a time of flight $T_{tof}$ of the reference echo pulse and the target echo pulse and calculating a distance L between the reference echo pulse and the target echo pulse, wherein $T_{tof}=N(T_2-T_1)-\tau_{p1}-\tau_{p4}$, $L=c\cdot T_{tof}/2$, the $T_1$ denotes a period of the signal femtosecond pulse sequence, the $T_2$ denotes a period of the local oscillator femtosecond pulse sequence, and the c denotes a speed of light.

BRIEF DESCRIPTION OF THE DRAWINGS

The present disclosure is further illustrated in terms of exemplary embodiments. These exemplary embodiments are described in detail according to the drawings. These embodiments are non-limiting exemplary embodiments, in which like reference numerals represent similar structures, wherein.

Figure 1:
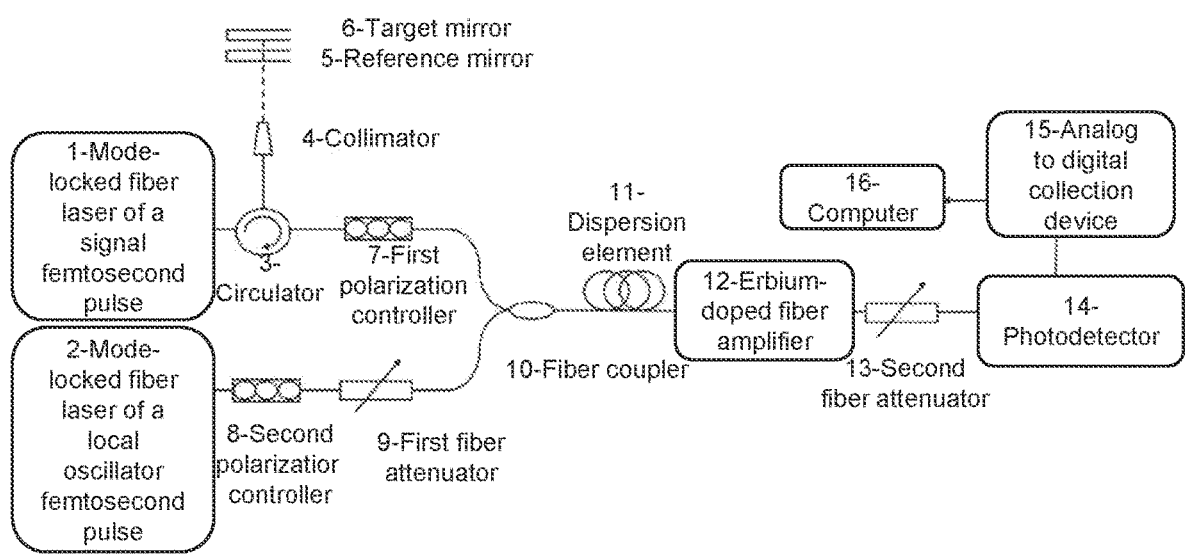
FIG. 1 is a schematic diagram of a structure of a ranging system of a dual optical frequency comb time-of-flight manner based on dispersive Fourier transform according to some embodiments of the present disclosure.

In the FIGURES, 1—mode-locked fiber laser of a signal femtosecond pulses, 2—mode-locked fiber laser of a local oscillator femtosecond pulse, 3—circulator, 4—collimator, 5—reference mirror, 6—target mirror, 7—first polarization controller, 8—second polarization controller, 9—first fiber attenuator, 10—fiber coupler, 11—dispersion element, 12—erbium-doped fiber amplifier, 13—second fiber attenuator, 14—photodetector, 15—analog to digital (A/D) collection device, 16—computer.

DETAILED DESCRIPTION

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

FIG. 1 a schematic diagram of a structure of a ranging system of a dual optical frequency comb time-of-flight manner based on dispersive Fourier transform according to some embodiments of the present disclosure.

As shown in FIG. 1, the ranging system of a dual optical frequency comb time-of-flight manner based on dispersive Fourier transform includes a mode-locked fiber laser of a signal femtosecond pulse 1, a mode-locked fiber laser of a local oscillator femtosecond pulse 2, a circulator 3, a collimator 4, a reference mirror 5, a target mirror 6, a first polarization controller 7, a second polarization controller 8, a first fiber attenuator 9, a fiber coupler 10, a dispersion element 11, an erbium-doped fiber amplifier 12, a second fiber attenuator 13, a photodetector 14, an analog to digital (A/D) collection device 15, and a computer 16.

The mode-locked fiber laser of a signal femtosecond pulse 1 (optical frequency comb) generates a signal femtosecond pulse sequence with a first repetition frequency, the signal femtosecond pulse sequence is injected into the collimator 4 through a first port of the circulator 3, collimated light propagates in free space and is reflected by the reference mirror 5 and the target mirror 6 in turn to obtain a reference echo pulse and a target echo pulse with a certain time delay. The time delay is a time of flight corresponding to a distance to be measured, and the two echo pulses are injected into the first polarization controller 7 through a third port of the circulator.

The mode-locked fiber laser of a local oscillator femtosecond pulse 2 (optical frequency comb) generates a local oscillator femtosecond pulse sequence with a second repetition frequency, the local oscillator femtosecond pulse sequence is coupled with the reference echo pulse and the signal echo pulse through the fiber coupler (50:50) 10 after passing through the second polarization controller 8 and the first fiber attenuator 9 in turn. The first polarization controller 7 and the second polarization controller 8 are used to adjust polarization states of two paths of light to be same. After the coupled three pulses (i.e., the local oscillator femtosecond pulse sequence, a reference echo pulse sequence, and a target echo pulse sequence) pass through a segment of the dispersion element (ordinary single-mode fiber) 11 of a large amount of dispersion and output when their power is amplified to an appropriate power through the erbium-doped fiber amplifier 12, the coupled three pulses enter the second fiber attenuator 13 and enter the photodetector 14 to be detected after adjusted by the second fiber attenuator 13. Then, the coupled three pulses are performed with an analog-to-digital conversion by the A/D collection device (e.g., a high-speed oscilloscope) 15 and are transmitted to the computer 16 for data processing.

The mode-locked fiber laser refers to a device that convert optical energy into a laser beam using a mode-locking technology. The mode-locking technology refers to a technology used to generate an extremely short laser pulse.

The mode-locked fiber laser of a signal femtosecond pulse 1 refers to a mode-lock fiber laser that generates a femtosecond pulse signal as an optical signal. The femtosecond pulse signal refers to an extremely short optical pulse signal, which may merely last for few hundred femtoseconds.

In some embodiments, the mode-locked fiber laser of a signal femtosecond pulse 1 may be used to obtain the signal femtosecond pulse sequence with the first repetition frequency.

The first repetition frequency refers to a count of pulses output by the mode-locked fiber laser of a signal femtosecond pulse per unit of time.

The signal femtosecond pulse sequence refers to a sequence consisting of laser beams emitted by the mode-locked fiber laser of a signal femtosecond pulse.

The mode-locked fiber laser of a local oscillator femtosecond pulse 2 refers to a laser of a same type as the mode-locked fiber laser of a signal femtosecond pulse and with the second repetition frequency.

In some embodiments, the mode-locked fiber laser of a local oscillator femtosecond pulse 2 may be used to obtain the local oscillator femtosecond pulse sequence.

The second repetition frequency refers to a count of pulses output by the mode-locked fiber laser of a local oscillator femtosecond pulse per unit of time.

The local oscillator femtosecond pulse sequence refers to a sequence consisting of laser beams emitted by a laser of the same type as the mode-locked fiber laser of a signal femtosecond pulse and with the second repetition frequency.

In some embodiments, the first repetition frequency and the second repetition frequency are different.

In some embodiments, a value of the first repetition frequency $f_{r1}$ may be in a range of 1 MHz~100 MHz, and a value of the second repetition frequency $f_{r2}$ may be in a range of 1 MHz~100 MHz. For example, the first repetition frequency is 27.72094 MHz, and the second repetition frequency is 27.80698 MHz. As another example, the first repetition frequency $f_{r1}$ may be one of 1 MHz, 50 MHz, and 100 MHz, and the second repetition frequency $f_{r2}$ may also be one of 1 MHz, 50 MHz, and 100 MHz, and the first repetition frequency and the second repetition frequency are different.

In some embodiments, a repetition period $\Delta T$ of the signal femtosecond pulse sequence and the local oscillator femtosecond pulse sequence may be less than twice a maximum pulse time delay in the dispersive Fourier transform, and $\Delta T=T_2-T_1$, $T_1$ is a period of the signal femtosecond pulse sequence and $T_2$ is a period of the local oscillator femtosecond pulse sequence.

In some embodiments, the maximum pulse time delay may be determined based on an amount of dispersion of the used dispersion element, a bandwidth of the photodetector, and a bandwidth and a sampling rate of the A/D collection device. For example, the computer may determine the maximum pulse time delay based on the amount of dispersion of the used dispersion element, the bandwidth of the photodetector, and the bandwidth and the sampling rate of the A/D collection device through a first preset comparison table. The first preset comparison table includes a correspondence between a reference amount of dispersion of the dispersion element, a reference bandwidth of the photodetector, and a reference bandwidth and a reference sampling rate of the A/D collection device and a reference maximum pulse time delay. The first preset comparison table may be constructed based on prior knowledge or historical data.

In some embodiments of the present disclosure, the statistical demodulation technology of conventional envelope fitting is discarded by introducing the dispersive Fourier transform technology in the conventional dual optical frequency comb system. Since the system demodulates the time of flight through interferometric information even when the reference pulse and a ranging pulse are in close proximity to each other, the ranging "dead zone" in the conventional dual optical frequency comb system is completely eliminated.

In some embodiments, the mode-locked fiber laser of a signal femtosecond pulse 1, and the mode-locked fiber laser of a local oscillator femtosecond pulse 2 may adopt a same type of passive mode-locked fiber laser.

The passive mode-locked fiber laser refers to a nonlinear all-fiber laser device.

In some embodiments, the passive mode-locked fiber laser includes at least one of a mode-locked fiber laser based on a real saturable absorber, a mode-locked fiber laser based on a nonlinear amplifying loop mirror (NALM), a mode-locked fiber laser based on a nonlinear polarization rotation (NPR) effect, or a mode-locked fiber laser based on nonlinear multimode interference (NL-MMI). For example, the passive mode-locked fiber laser is the mode-locked fiber laser based on a nonlinear polarization rotation (NPR) effect.

The circulator 3 refers to a multi-port device that transmits signals in one direction. In some embodiments, the circulator may include the first port, a second port, and the third port. In some embodiments, a signal femtosecond pulse sequence may be injected into the circulator 3 through the first port, output from the circulator 3 through the second port, and injected into the collimator 4. In some embodiments, an echo signal may be injected into the circulator 3 through the second port, output from the circulator 3 through the third port, and injected into the first polarization controller 7.

The collimator 4 refers to an optical element that converts a diverging beam emitted by the circulator into a parallel beam.

The reference mirror 5 refers to an optical element used to reflect the parallel beam output by the collimator and obtain the reference echo pulse sequence. The reference echo pulse sequence refers to a sequence consisting of a plurality of reference echo pulses. The reference echo pulses refer to echo pulses for reference.

The target mirror 6 refers to an optical element used to reflect the parallel beam output by the collimator and obtain the target echo pulse sequence. The target echo pulse sequence refers to a sequence consisting of a plurality of target echo pulses. The target echo pulses refer to echo pulses that need to be obtained in the end.

In some embodiments, the reference echo pulse sequence and the target echo pulse sequence together form the echo signal.

The first polarization controller 7 refers to a device for controlling a polarization state of light in the echo signal.

The second polarization controller 8 refers to a device for controlling a polarization state of light in the local oscillator femtosecond pulse sequence.

In some embodiments, the first polarization controller 7 and the second polarization controller 8 may be used to adjust the polarization states of the two paths of light, so that they are in a same polarization state.

The first fiber attenuator 9 may be used to adjust a power of an optical signal in the local oscillator femtosecond pulse sequence.

The second fiber attenuator 13 may be used to adjust a power of an optical signal output by the erbium-doped fiber amplifier 12.

The erbium-doped fiber amplifier 12 refers to a device for performing optical signal amplification.

The fiber coupler 10 refers to an optical device for implementing splitting or combining of optical signals.

The dispersion element 11 refers to an element that performs spectral separation on optical signals input at the same time. In some embodiments, the dispersion element may include, but is not limited to a fiber element with a large group velocity dispersion parameter such as a standard single-mode fiber, a dispersion-compensated fiber, or a chirped Bragg grating. The group velocity dispersion refers to a phenomenon in which light of different frequencies in polychromatic light has different refractive indices in a same medium and has different propagation velocities in the same medium, so that the light of different frequencies in the polychromatic light is dispersed in an outgoing region and a spectrum is formed.

In some embodiments, a total amount of dispersion of the dispersion element 11 makes the local oscillator femtosecond pulse sequence, the reference echo pulse sequence, and the target echo pulse sequence be fully stretched in a time domain, and a stretching value of each pulse sequence of the local oscillator femtosecond pulse sequence, the reference echo pulse sequence, and the target echo pulse sequence does not exceed a self-period of the each pulse sequence.

In some embodiments of the present disclosure, a stray relationship of the pulse time domain is amplified using the dispersion element, and the precise position relationship of the three pulses may be obtained directly through the interference fringe information, which improves the ranging accuracy. The theoretical ranging accuracy limit of the system is only affected by the pulse jitter caused by the drift of the light source frequency over time. Moreover, the system does not need to satisfy the Nyquist sampling theorem, and a repetition frequency difference of the dual optical frequency comb may be increased to a magnitude of MHz, which greatly improves the ranging speed.

The photodetector 14 refers to a device for converting the optical signal into an analog electrical signal. In some embodiments, since a strong noise immunity of the ranging system of a dual optical frequency comb time-of-flight manner based on dispersive Fourier transform and there is no need to reduce noise by a balanced photodetector, the photodetector may be an unbalanced photodetector. The unbalanced photodetector refers to a detector that does not have a balanced circuit added to a front end of the photodetector. The balanced circuit may be used to counteract stray light in a photosensitive element and noise in the circuit, thereby improving the signal-to-noise ratio and sensitivity of the detector.

In some embodiments, the bandwidth of the photodetector 14 may be greater than 10 GHz. By setting the bandwidth of the photodetector 14 to be greater than 10 GHz, the bandwidth of the photodetector is made large enough to better detect the interfering signal output after being adjusted by the second fiber attenuator 13.

The A/D collection device 15 refers to a device that converts the analog electrical signal to a digital signal.

In some embodiments, the bandwidth of the A/D collection device 15 is greater than or equal to 16 GHz, the sampling rate of the A/D collection device 15 is greater than or equal to 40 Gs/s, and a length of time for each collection is greater than or equal to $1/|f_{r1}-f_{r2}|$, wherein $f_{r1}$ is the first repetition frequency and $f_{r2}$ is the second repetition frequency. For example, the A/D collection device 15 may be a high-speed oscilloscope with a bandwidth of 16 GHz and a maximum sampling rate of 40 Gs/s.

The computer 16 may be used to obtain the time of flight and the distance between the target echo pulse and the reference echo pulse by processing data from the A/D collection device.

Figure 2:
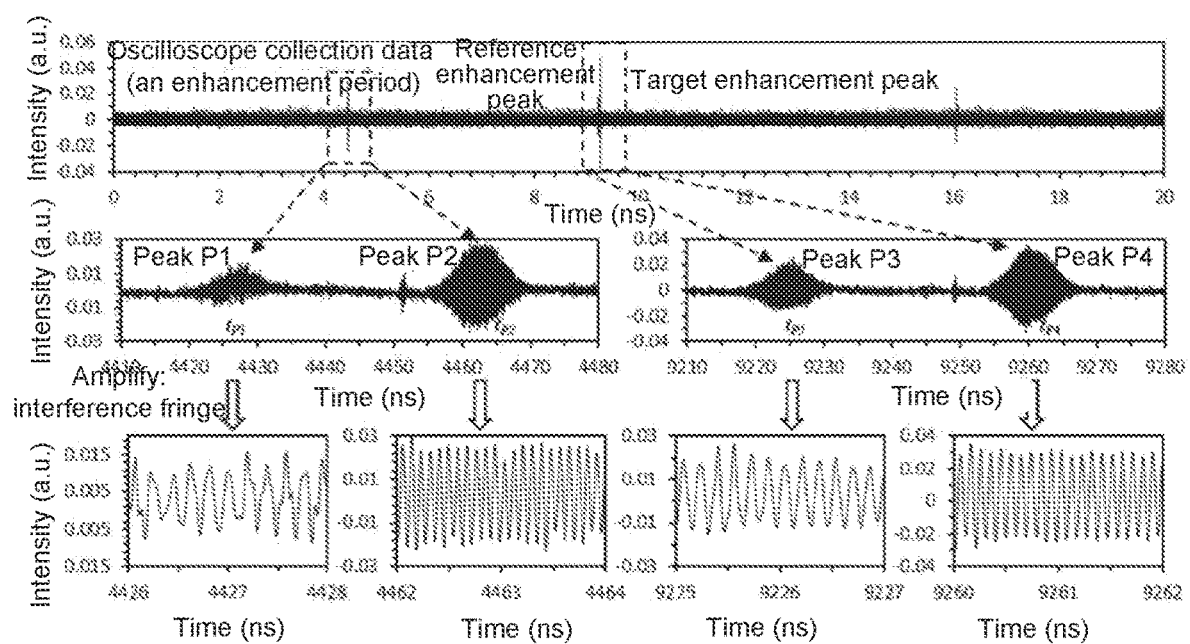
FIG. 2 is a schematic diagram illustrating an interferogram pattern collected by an oscilloscope in a ranging system of a dual optical frequency comb time-of-flight manner based on dispersive Fourier transform and local features thereof according to some embodiments of the present disclosure.
Figure 3:
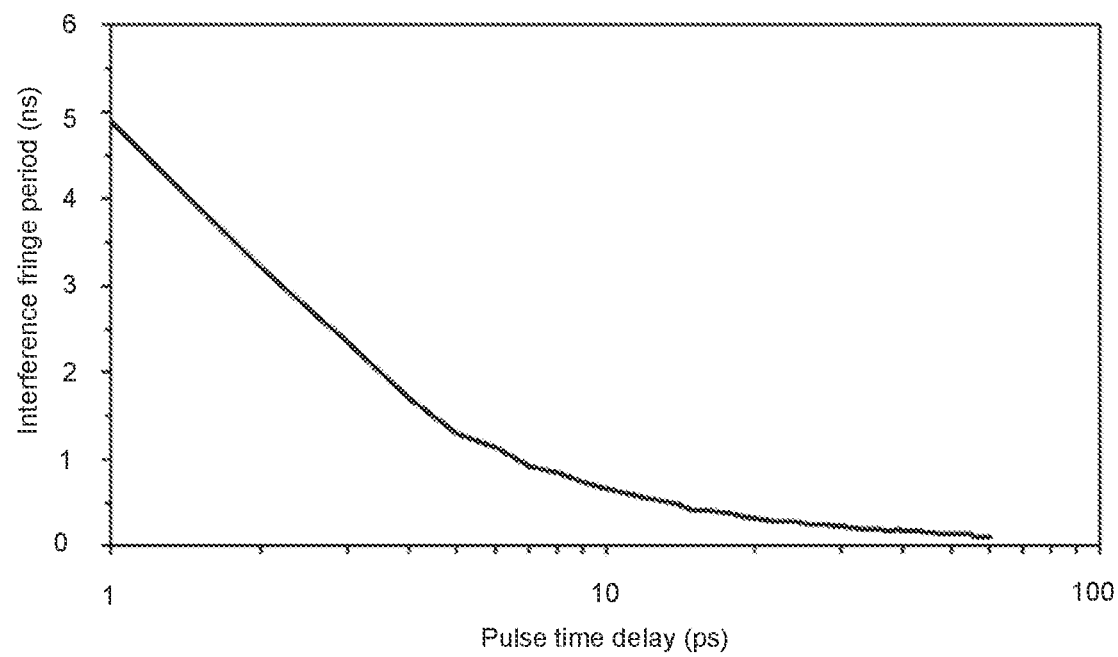
FIG. 3 is a schematic diagram of a correspondence between an interference fringe period and a pulse time delay in a ranging system of a dual optical frequency comb time-of-flight manner based on dispersive Fourier transform according to some embodiments of the present disclosure.

FIG. 2 is a schematic diagram illustrating an interferogram pattern collected by an oscilloscope in a ranging system of a dual optical frequency comb time-of-flight manner based on dispersive Fourier transform and local features thereof according to some embodiments of the present disclosure. The horizontal axis in FIG. 2 represents a time in ns, and the vertical axis represents an intensity in a.u. FIG. 3 is a schematic diagram of a correspondence between an interference fringe period and a pulse time delay in a ranging system of a dual optical frequency comb time-of-flight manner based on dispersive Fourier transform according to some embodiments of the present disclosure. The horizontal axis in FIG. 3 represents the pulse time delay in ps, and the vertical axis represents the interference fringe period in ns.

In some embodiments, taking FIG. 2 and FIG. 3 as an example, the data processing in the computer 16 may include operations 310-340 below.

In 310, collecting, by the A/D collection device 15, a time-domain waveform of an update period, the time-domain waveform including information of a reference enhancement peak and a target enhancement peak, wherein the reference enhancement peak includes successive enhancement peak P1 and enhancement peak P2, and center moments of the enhancement peak P1 and the enhancement peak P2 correspond to $t_{p1}$ and $t_{p2}$ in turn; and the target enhancement peak includes successive enhancement peak P3 and enhancement peak P4, and center moments of the enhancement peak P3 and the enhancement peak P4 correspond to $t_{p3}$ and $t_{p4}$ in turn.

In 320, calculating a count N of local oscillator pulse periods between the enhancement peak P1 and the enhancement peak P4, wherein $N=\lfloor(t_{P4}-t_{P1})/T_2\rfloor$, and $\lfloor \ \rfloor$ denotes rounding down.

In 330, obtaining an interference fringe period of the enhancement peak P1 and an interference fringe period of the enhancement peak P4 by performing Fourier transform on a time signal of the enhancement peak P1 and a time signal of the enhancement peak P4, respectively, and recording the interference fringe period of the enhancement peak P1 and the interference fringe period of the enhancement peak P4 as $T_{p1}$ and $T_{p4}$ in turn; and obtaining a time delay $\tau_{p1}$ between a reference echo pulse and a local oscillator pulse in the enhancement peak P1 and a time delay $\tau_{p4}$ between a target echo pulse and a local oscillator pulse in the enhancement peak P4, wherein $\tau_{p1}=D/T_{p1}$, $\tau_{p4}=D/T_{p4}$, and the D denotes a total amount of dispersion applied to the pulse by the dispersion element.

In 340, obtaining a time of flight $T_{tof}$ of the reference echo pulse and the target echo pulse and calculating a distance L between the reference echo pulse and the target echo pulse, wherein $T_{tof}=N(T_2-T_1)-\tau_{p1}-\tau_4$, $L=c\cdot T_{tof}/2$, the $T_1$ denotes a period of the signal femtosecond pulse sequence, the $T_2$ denotes a period of the local oscillator femtosecond pulse sequence, and the c denotes a speed of light.

In some embodiments of the present disclosure, compared with other optical frequency combs, the mode-locked fiber laser of a signal femtosecond pulse and the mode-locked fiber laser of a local oscillator femtosecond pulse adopting the mode-locked fiber laser based on a nonlinear polarization rotation effect have advantages of a simple structure, low noise, high power, and self-starting. Center wavelengths of two optical frequency combs are 1560 nm and a 3 dB spectral widths of the two optical frequency combs are 20 nm. The signal femtosecond mode-locked laser frequency comb has a first repetition frequency $f_{r1}$ of 27.72094 MHz, and the local oscillator femtosecond mode-locked laser frequency comb has a second repetition frequency $f_{r2}$ of 27.80698 MHz, and a difference in repetition frequency Δf1 is 86.01 kHz. Therefore, an enhancement period after asynchronous sampling is approximately 11.63 μs.

According to the repetition frequencies and central wavelengths of the mode-locked fiber laser of a signal femtosecond pulse and the mode-locked fiber laser of a local oscillator femtosecond pulse, a standard single-mode fiber is chosen as the dispersion element. According to the amount of dispersion, a usage length Q needs to be in a range of 0.28 m≤Q<100 km. Therefore, the usage length Q selected herein is 50 km. In addition, the unbalanced photodetector 14 with a bandwidth of 10 GHz is selected, and the A/D collection device 15 uses a high-speed oscilloscope with a bandwidth of 16 GHz and a maximum sampling rate of 40 Gs/s.

In some embodiments of the present disclosure, the reference mirror 5 is fixed, and a position of the target mirror 6 is finely adjusted according to a certain step size. For each set of test distances, data is continuously collected by the oscilloscope for 120 μs (including 10 update periods), a distance value is calculated for each period, and a final distance value may be obtained by averaging 10 distance values.

Finally, in the embodiments of the present disclosure, a maximum unambiguous range corresponding to the ranging system is 1.875 km and the ranging accuracy corresponding to the ranging system is a magnitude of sub-nm, which is greatly improved compared with the conventional ranging system (with a ranging accuracy being a magnitude of μm) without the dispersive Fourier transform. It is worth mentioning that the theoretical ranging accuracy of the ranging system provided in the embodiment is only affected by the pulse jitter caused by the drift of the light source frequency over time. If the light source is further stabilized and controlled, the ranging accuracy without a magnitude may be achieved. At the same time, the ranging system completely eliminates the "dead zone" phenomenon of ranging and also has a large measurement range, a high measurement accuracy, and a high measurement speed.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

These alterations, improvements, and modifications are intended to be suggested by this disclosure and are within the spirit and scope of the exemplary embodiments of this disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present disclosure) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A ranging system of a dual optical frequency comb time-of-flight manner based on dispersive Fourier transform, comprising: a mode- locked fiber laser of a signal femtosecond pulse, a mode-locked fiber laser of a local oscillator femtosecond pulse, a circulator, a collimator, a reference mirror, a target mirror, a first polarization controller, a second polarization controller, a first fiber attenuator, a fiber coupler, a dispersion element, an erbium-doped fiber amplifier, a second fiber attenuator, a photodetector, an analog to digital (A/D) collection device, and a computer, wherein the mode-locked fiber laser of a signal femtosecond pulse and the mode-locked fiber laser of a local oscillator femtosecond pulse emit a signal femtosecond pulse sequence and a local oscillator femtosecond pulse sequence, respectively, the signal femtosecond pulse sequence having a first repetition frequency, and the local oscillator femtosecond pulse sequence having a second repetition frequency; the signal femtosecond pulse sequence is injected into the collimator through a first port of the circulator, collimated space light is emitted to the reference mirror and the target mirror to obtain an echo signal including a reference echo pulse sequence and a target echo pulse sequence, and the echo signal is injected into the first polarization controller through a third port of the circulator; and the local oscillator femtosecond pulse sequence is coupled with the echo signal through the fiber coupler after passing through the second polarization controller and the first fiber attenuator in turn; and the dispersive Fourier transform is performed on an output signal of the fiber coupler through the dispersion element, an optical signal is amplified through the erbium-doped fiber amplifier, an optical power is adjusted through the second fiber attenuator, and the photodetector detects an output interfering signal to obtain an analog electrical signal, the analog electrical signal being converted into a digital signal by the A/D collection device and transmitted to the computer for data processing.

2. The ranging system of a dual optical frequency comb time-of-flight manner based on dispersive Fourier transform of claim 1, wherein the mode-locked fiber laser of a signal femtosecond pulse and the mode-locked fiber laser of a local oscillator femtosecond pulse adopt a same type of passive mode-locked fiber laser, and the passive mode-locked fiber laser includes a mode-locked fiber laser based on a real saturable absorber, a mode-locked fiber laser based on a nonlinear amplifying loop mirror (NALM), a mode-locked fiber laser based on a nonlinear polarization rotation (NPR) effect, or a mode-locked fiber laser based on nonlinear multimode interference (NL-MMI).

3. The ranging system of a dual optical frequency comb time-of-flight manner based on dispersive Fourier transform of claim 1, wherein a value of the first repetition frequency of the signal femtosecond pulse sequence is in a range of 1 MHZ~100 MHz, and a value of the second repetition frequency of the local oscillator femtosecond pulse sequence is in a range of 1 MHz~100 MHz; a repetition period difference $\Delta T$ of the signal femtosecond pulse sequence and the local oscillator femtosecond pulse sequence is less than twice a maximum pulse time delay in the dispersive Fourier transform; and $\Delta T=T_2-T_1$ the $T_1$ being a period of the signal femtosecond pulse sequence and the $T_2$ being a period of the local oscillator femtosecond pulse sequence.

4. The ranging system of a dual optical frequency comb time-of-flight manner based on dispersive Fourier transform of claim 1, wherein a total amount of dispersion of the dispersion element makes the local oscillator femtosecond pulse sequence, the reference echo pulse sequence, and the target echo pulse sequence be fully stretched in a time domain, and a stretching value of each pulse sequence of the local oscillator femtosecond pulse sequence, the reference echo pulse sequence, and the target echo pulse sequence does not exceed a self-period of the each pulse sequence.

5. The ranging system of a dual optical frequency comb time-of-flight manner based on dispersive Fourier transform of claim 1, wherein a bandwidth of the photodetector is greater than 10 GHz.

6. The ranging system of a dual optical frequency comb time-of-flight manner based on dispersive Fourier transform of claim 1, wherein a bandwidth of the A/D collection device is greater than 16 GHz and a sampling rate of the A/D collection device is greater than 40 Gs/s, and a length of time of each collection is greater than or equal to $1/|f_{r1}-f_{r1}|$, the $f_{r1}$ being the first repetition frequency and the $f_{r2}$ being the second repetition frequency.

7. The ranging system of a dual optical frequency comb time-of-flight manner based on dispersive Fourier transform of claim 1, wherein the data processing in the computer includes:

collecting, by the A/D collection device, a time-domain waveform of an update period, the time-domain waveform including information of a reference enhancement peak and a target enhancement peak, wherein the reference enhancement peak includes successive enhancement peak P1 and enhancement peak P2, and center moments of the enhancement peak P1 and the enhancement peak P2 correspond to $t_{p1}$ and $t_{p2}$ in turn; and the target enhancement peak includes successive enhancement peak P3 and enhancement peak P4, and center moments of the enhancement peak P3 and the enhancement peak P4 correspond to $t_{p3}$ and $t_{p4}$ in turn;

calculating a count N of local oscillator pulse periods between the enhancement peak P1 and the enhancement peak P4, wherein $N=\lfloor (t_{p4}-t_{p1})/T_2 \rfloor$, and $\lfloor \ \rfloor$ denotes rounding down;

obtaining an interference fringe period of the enhancement peak P1 and an interference fringe period of the enhancement peak P4 by performing Fourier transform on a time signal of the enhancement peak P1 and a time signal of the enhancement peak P4, respectively, and recording the interference fringe period of the enhancement peak P1 and the interference fringe period of the enhancement peak P4 as $T_{p1}$ and $T_{p4}$ in turn; and obtaining a time delay $\tau_{p1}$ between a reference echo pulse and a local oscillator pulse in the enhancement peak P1 and a time delay $\tau_{p4}$ between a target echo pulse and a local oscillator pulse in the enhancement peak P4, wherein $\tau_{p1}=D/T_{p1}$, $\tau_{p4}=D/T_{p4}$, and the D denotes a total amount of dispersion applied to the pulse by the dispersion element; and obtaining a time of flight $T_{tof}$ of the reference echo pulse and the target echo pulse and a distance L between the reference echo pulse and the target echo pulse, wherein $T_{tof}=N(T_2-T_1)-\tau_{p1}-\tau_{p4}$, $L=c \cdot T_{tof}/2$, the $T_1$ denotes a period of the signal femtosecond pulse sequence, the $T_2$ denotes a period of the local oscillator femtosecond pulse sequence, and the c denotes a speed of light.

* * * * *